United States Patent [19]

Ruckgaber

[11] Patent Number: 4,964,096

[45] Date of Patent: Oct. 16, 1990

[54] METHOD FOR INVERSION OF SEISMIC DATA TO YIELD ESTIMATES OF FORMATION LITHOLOGY

[75] Inventor: Gary M. Ruckgaber, Tulsa, Okla.

[73] Assignee: Amoco Corporation, Chicago, Ill.

[21] Appl. No.: 197,947

[22] Filed: May 24, 1988

[51] Int. Cl.$^5$ ............................................. G01V 1/34
[52] U.S. Cl. ........................................ 367/70; 367/68
[58] Field of Search ................ 367/58, 59, 63, 68, 367/70, 72, 75; 364/421

[56] References Cited

U.S. PATENT DOCUMENTS

| | | | |
|---|---|---|---|
| 4,375,090 | 2/1983 | Thompson et al. | 367/73 |
| 4,398,273 | 8/1983 | Thompson et al. | 367/73 |
| 4,422,165 | 12/1983 | Thomas et al. | 367/40 |
| 4,534,019 | 8/1985 | Wiggins et al. | 367/75 |
| 4,554,649 | 11/1985 | Herkenhoff et al. | 367/68 |
| 4,562,558 | 12/1985 | Ostrander | 367/68 |
| 4,633,447 | 12/1986 | Bodine | 367/70 |
| 4,692,910 | 9/1987 | Sondergeld et al. | 367/75 |

Primary Examiner—Thomas H. Tarcza
Assistant Examiner—Ian J. Lobo
Attorney, Agent, or Firm—Timothy D. Stanley

[57] ABSTRACT

The present invention relates generally to seismic exploration and more particularly to a method for inversion of seismic data to yield estimates of formation lithology. Seismic data representing a measure of reflectivity of subsurface formations to seismic energy imparted therein can be inverted to obtain measures of formation elastic properties. By cross-plotting selected formation elastic properties on a color-binned lithology diagram, a lithology section can be produced having increased lithological resolution.

14 Claims, 8 Drawing Sheets

METHOD FOR INVERSION OF SEISMIC DATA TO YIELD ESTIMATES OF FORMATION LITHOLOGY

BACKGROUND OF THE INVENTION

The present invention relates generally to seismic exploration and more particularly to a method for inversion of seismic data to yield estimates of formation lithology.

In seismic exploration, it is conventional to place a plurality of seismic receivers along the earth's surface at spaced locations. A plurality of seismic sources disposed at spaced locations along the earth's surface can then be activated to generate seismic waves which propagate outwardly in all directions. The seismic waves thus generated are refracted, reflected, and diffracted from subsurface formation interfaces and some of these diverted seismic waves are detected by the seismic receivers and can be processed to form a seismic signal. Such seismic signals can be displayed as seismic sections which contain information about the reflectivity of the subsurface formations to the imparted seismic energy as represented by the time, duration and intensity of reflection events in the seismic signals.

As the field of seismic exploration has advanced, geophysicists have sought additional methods for extracting information about the earth's subsurface formations from seismic reflectivity data. By way of example, Thompson et al. in U.S. Pat. Nos. 4,375,090 and 4,398,273 describe methods for interpreting seismic reflectivity data to yield indications of oil and gas in subsurface formations. Herkenhoff et al. in U.S. Pat. No. 4,554,649 and Ostrander in U.S. Pat. No. 4,562,558 describe methods for interpreting seismic reflectivity data to yield indications of gas-bearing lithologies. Additionally, Sondergeld et al. in U.S. Pat. No. 4,692,910 describe methods for determining formation lithologies from well logging compressional velocity and shear velocity transmission data. Whereas, Thomas et al. in U.S. Pat. No. 4,422,165 describe a method for estimating the ratio of velocities of compressional and shear waves in subsurface formations from seismic reflectivity data. Although these methods each have certain advantages, they are incapable or insufficiently developed to fully exploit the maximum resolution attainable from seismic reflectivity data.

In spite of such advances, the geophysical art has failed to provide a method for the inversion of seismic reflectivity data to yield estimates of formation lithology or to produce lithology sections having a resolution comparable to the resolution of seismic reflectivity data from which they are obtained. The present invention provides a novel method for addressing such shortcomings as well as a novel method for transforming estimates of formation lithology into chromatic lithology sections having unique colors assigned to selected combinations of formation lithologies.

SUMMARY OF THE INVENTION

The present invention relates generally to seismic exploration and more particularly to a method for inversion of seismic reflectivity data to yield estimates of formation lithology. Seismic reflectivity data, representing a measure of reflectivity of subsurface formations to seismic energy imparted therein, can be inverted to obtain selected measures of formation elastic properties. By cross-plotting pairs of selected formation elastic properties on a lithology diagram, lithology sections can be produced having lithological resolutions comparable to the resolution of the seismic reflectivity data from which they are obtained.

In one embodiment of the invention, seismic reflectivity data are corrected for phase distortion, frequency band content, and amplitude scaling prior to inversion. The corrected seismic reflectivity data can then be processed to obtain measures of shear wave and compressional wave velocities in the subsurface formations. By mapping corresponding pairs of compressional wave velocity and the ratio of compressional wave velocity to shear wave velocity on a lithology diagram, estimates of formation lithology can be obtained. Employing a color look-up table wherein selected combinations of formation lithologies logical section depicting estimates of formation lithology corresponding to the seismic reflectivity data can be produced having a resolution comparable to that of the seismic reflectivity data.

DETAILED DESCRIPTION OF THE PREFERRED EMBODIMENT

The present invention relates generally to a method of seismic exploration and more particularly, to a method for inversion of seismic data to yield estimates of formation lithology.

In order to assist in understanding the present invention, the following introductory discussion is presented. In seismic exploration, seismic energy is imparted into the earth's subsurface formations and the earth's response thereto is recorded as seismic signals. The time, duration and intensity of events recorded in the seismic signals provide information about the reflectivity of the earth's subsurface formations to the imparted seismic energy. The present invention provides a method for inversion of such seismic reflectivity data which can yield estimates of subsurface formation lithologies having horizontal and vertical (i.e., spatial and time) resolution comparable to that of the seismic reflectivity data from which they are obtained. In the geophysical art, the process of inversion can be most easily understood as a method for extracting physical features of the earth's formations to imparted seismic energy (e.g., velocities, lithologies) from observations of the seismic energy's effects (e.g., reflectivity).

Figure 1:
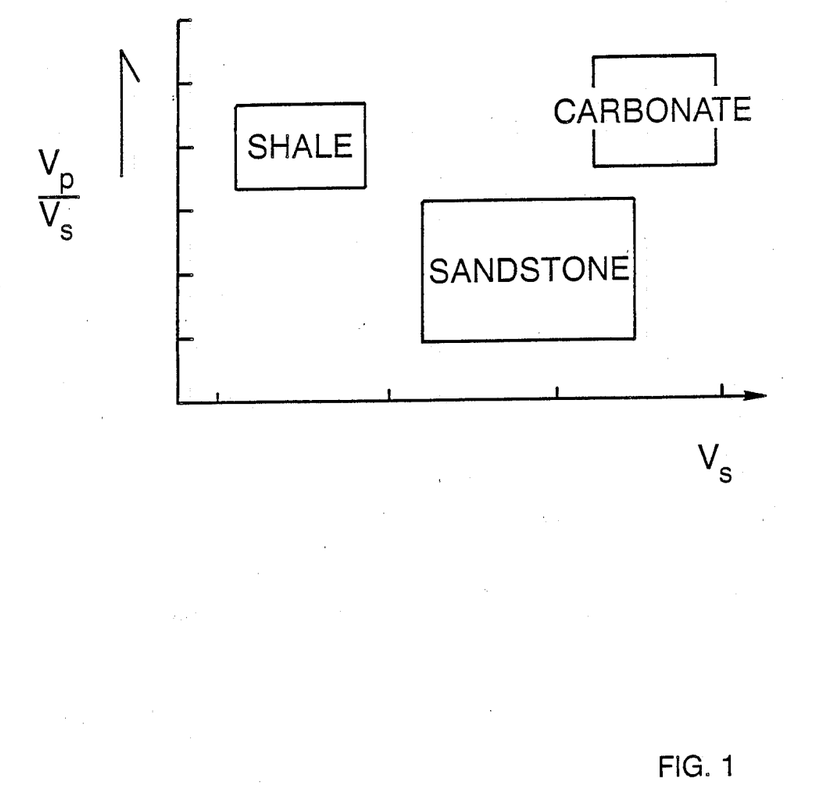
FIG. 1 is a representation of a lithology diagram having axes of formation elastic properties for discriminating formation lithologies.

Looking now to FIG. 1, a generalized lithology diagram is depicted which provides a capability for discriminating formation lithologies (such as sandstone, carbonate and shale) provided that formation compressional wave (Vp) and shear wave (Vs) velocities are known. Moreover, Sondergeld et al. in U.S. Pat. No. 4,692,910 describe a method for discriminating formation lithologies employing well logging velocity transmission data. More generally, lithology diagrams, such as FIG. 1, can provide a basis for discriminating formation lithologies employing selected formation elastic properties (for example, Poisson's ratio, bulk modulus, compressional wave velocity, shear wave velocity, etc.).

Figure 2:
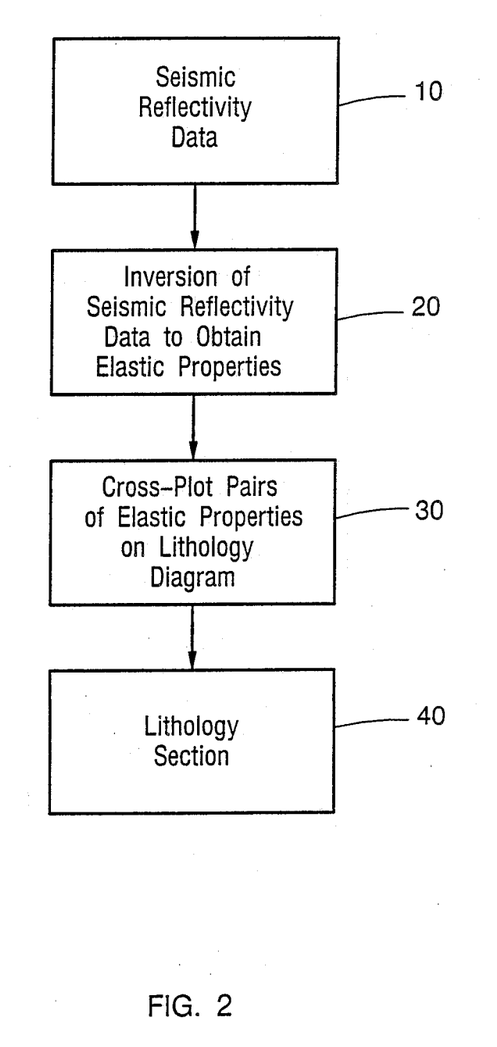
FIG. 2 is a general process flow diagram of the present invention.

With reference now to FIG. 2, the method of the present invention will be described. At step 10, seismic reflectivity data representative of the earth's reflectivity to imparted seismic energy are obtained. Such seismic reflectivity data can include both two-dimensional and three-dimensional seismic data. Moreover, it is preferable that such seismic reflectivity data include information regarding the earth's response to both compressional wave (P) and shear wave (S) seismic energy. Although the preferred method of obtaining coincident compressional wave and shear wave seismic reflectivity data is by separate acquisition techniques using shear wave seismic sources and receivers and compressional wave seismic sources and receivers, those skilled in the art will appreciate that other techniques are available to obtain coincident compressional wave and shear wave seismic reflectivity data. By way of example, one can record the earth's response to seismic energy imparted by a compressional wave source with both shear wave and compressional wave receivers or one can process conventional compressional wave seismic reflectivity data to enhance measures of shear wave reflectivity contained therein. Such latter acquisition techniques exploit the conversion of imparted compressional wave seismic energy to shear waves either at the source or at subsurface reflecting interfaces.

At step 20, the seismic reflectivity data are inverted to obtain measures of formation elastic properties including shear wave and compressional wave interval velocities, Poisson's ratio, bulk modulus, etc. Various methods are available for inversion of the seismic reflectivity data; however, such inversion techniques generally assume the seismic reflectivity data are not phase distorted, recorded signal amplitudes are properly scaled to reflection coefficients and the seismic reflectivity data contain a full bandwidth of seismic frequencies. Unfortunately, seismic reflectivity data are typically deficient in all of these requirements. Phase distortion is imparted by the earth itself as well as the seismic data acquisition system and recorded signal amplitudes do not generally coincide with reflection coefficient amplitudes. The frequency band content of the seismic reflectivity data are generally incomplete because current seismic data acquisition systems either do not initiate or do not detect low frequencies (e.g., generally less than 5 to 15 Hz).

Consequently, the seismic reflectivity data must first be corrected to eliminate phase distortion, to scale recorded signal amplitudes to reflectivity units and to reconstitute seismic energy frequency content. Once such corrections have been made, one may proceed to invert seismic reflectivity data to obtain measures of formation elastic properties. As will be discussed in further detail, a particular method for correcting and inverting frequency deficient seismic reflectivity data to obtain accurate estimates of interval velocities will be described.

Figure 3:
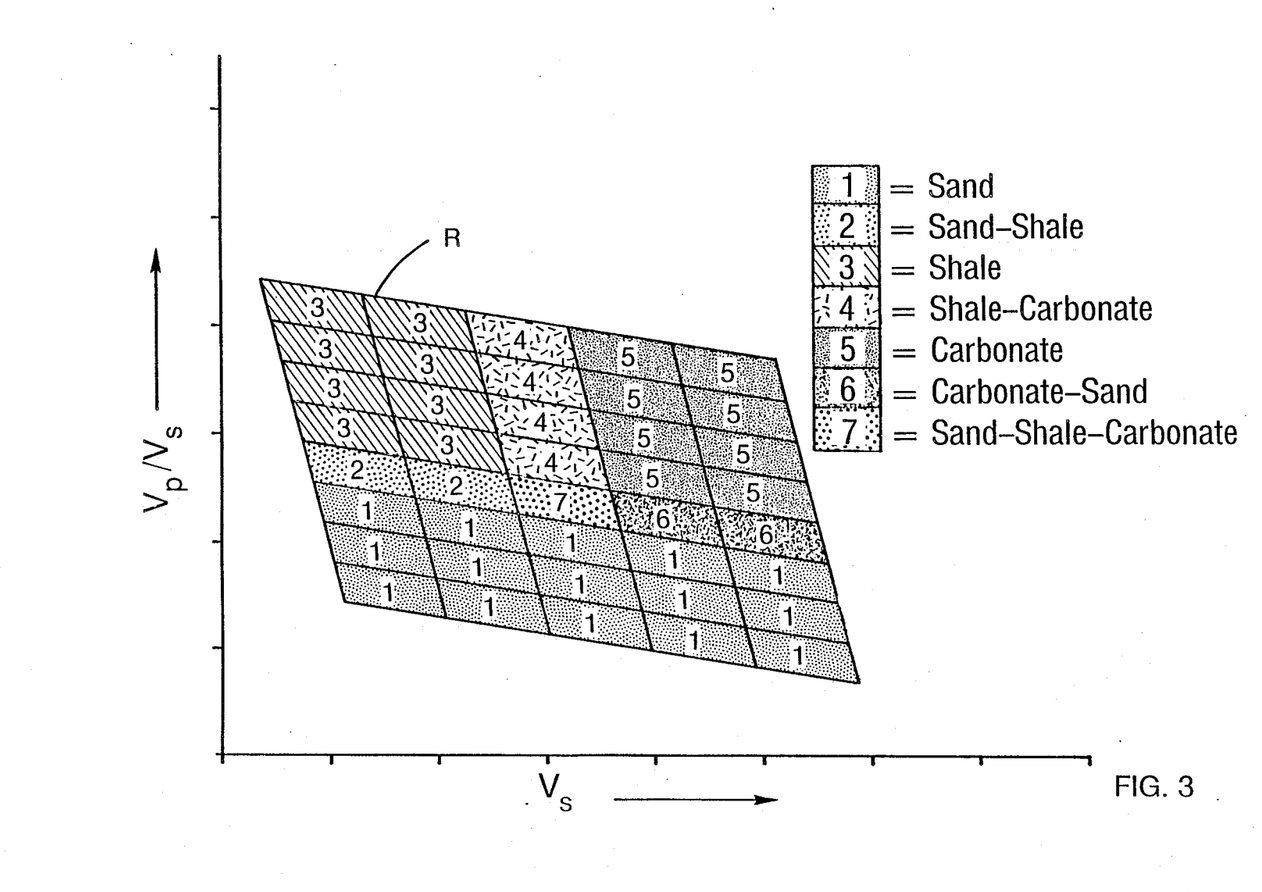
FIG. 3 is a lithology diagram according to the present invention.

At step 30, pairs of formation elastic properties obtained at step 20 from corresponding times or depths can be cross-plotted onto a lithology diagram. By way of example, a preferred lithology diagram is shown in FIG. 3. The preferred lithology diagram has separate axes of selected formation elastic properties (e.g., Vp/Vs and Vs) and an enclosed region R generally defining a relationship between combinations of formation lithologies and selected pairs of formation elastic properties.

The enclosed region R defines a parallelogram which generally encompasses the separate lithological regions of shale, sandstone and carbonates depicted in FIG. 1. Although a parallelogram is used to enclose a region defining a relationship between selected formation elastic properties and combinations of formation lithologies, those skilled in the art will appreciate that numerous other enclosed geometrical areas can be employed such as a triangle. Further, the enclosed region R can be subdivided into a plurality of bins. Each bin can have associated therewith a unique numeric identifier which corresponds to a selected combination of formation lithologies as depicted in the table of FIG. 3. Additionally, each bin can have associated therewith a unique color representing a selected combination of formation lithologies as indicated by the separate shading. By defining such numeric-chromatic identifiers, a novel method has been developed for automated computer processing of seismic reflectivity data to yield chromatic lithology sections as shall be more fully disclosed below.

Figure 7:
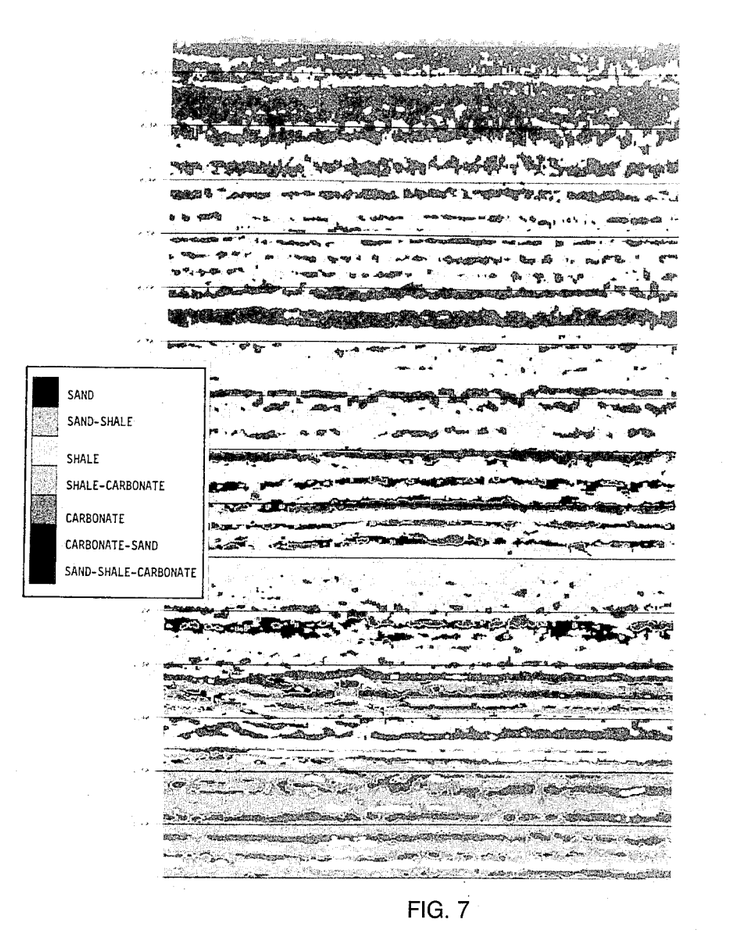
FIG. 7 is a color photograph of a chromatic lithology section obtained from a crossplot of formation elastic properties of FIGS. 6A and 6B on the lithology diagram of FIG. 3.

By cross-plotting selected pairs of formation elastic properties from corresponding times or depths (e.g., Vp/Vs and Vs) on the lithology diagram of FIG. 3, a lithology signal can be constructed having event amplitudes which coincide with the unique numeric identifier for each bin into which each selected pair of formation elastic property lies. Such lithology signal can be written to an output tape which may be plotted on a seismic plotter. In fact, with the aid of a color look-up table in which unique colors are assigned to each unique numeric identifier, a chromatic lithology section can be obtained at step 40, having both horizontal and vertical resolution comparable to that of the original seismic reflectivity data from which it has been obtained. A chromatic lithology section depicting selected combinations of formation lithologies obtained in accordance with the present invention is shown in FIG. 7.

Figure 4:
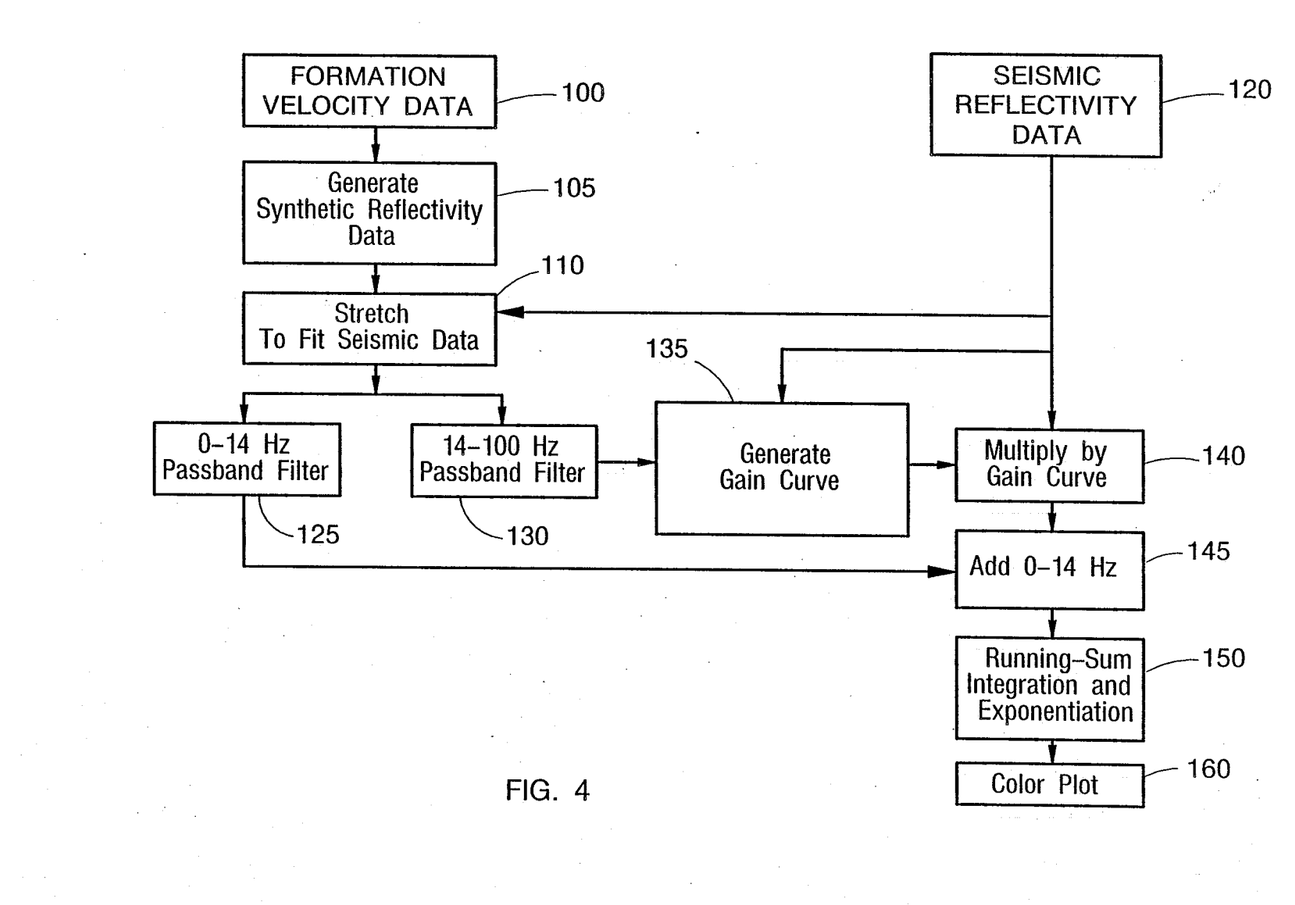
FIG. 4 is a process flow diagram describing a method for obtaining estimates of formation elastic properties from seismic reflectivity data.

With reference now to step 20 of FIG. 2 and FIG. 4, one method for correcting and inverting seismic reflectivity data to obtain estimates of the formation elastic properties compressional wave (Vp) and shear wave (Vs) interval velocities is depicted. The method is particularly adapted to inverting seismic reflectivity data deficient in low frequency content (e.g., 0-14 Hz).

Sonic well logging compressional wave and shear wave transmission velocity data from 100 can be employed to generate synthetic compressional wave and shear wave reflectivity signals at 105. At step 110, the synthetic compressional wave and shear wave reflectivity signals are stretched to fit (i.e., coincide in time) with the corresponding compressional wave and shear wave seismic reflectivity data from 120. The stretched synthetic reflectivity signals are passband filtered at steps 125 and 130 to separately pass 0-14 Hz and 14-100 Hz synthetic compressional wave and shear wave signals, respectively. For ease of further discussion, the 0-14 Hz and 14-100 Hz synthetic compressional wave and shear wave signals will simply be referred to as 0-14 Hz and 14-100 Hz synthetic signals; however, it is understood that the following process is to be applied to both types of synthetic signals. Unless indicated otherwise, the synthetic compressional wave signals will be used to correct the compressional wave seismic reflectivity data and obtain measures of the compressional wave interval velocities and the synthetic shear wave signals will be used to correct the shear wave seismic reflectivity data and obtain measures of the shear wave interval velocity.

The 14-100 Hz synthetic signals from step 130 are employed at step 135 to generate a gain signal to match the amplitude envelopes of the seismic reflectivity data from 120 and the corresponding amplitude envelopes of the 14-100 Hz synthetic reflectivity data. The amplitude envelopes of the seismic reflectivity data must be adjusted to remove amplitude flattening typically imposed by automatic gain control processes applied during seismic data processing to restore reflection coefficient amplitudes as represented by the synthetic reflectivity data obtained at step 105. This can be accomplished by comparing the amplitudes of corresponding principal reflectors on the synthetic reflectivity signals and the seismic reflectivity signals. The amplitude of a given synthetic event divided by the amplitude of the corresponding seismic event in the seismic reflectivity data is the gain correction that must be applied to the seismic reflectivity data at that time to make the amplitude of the seismic event equal to the amplitude of the synthetic event. This process can be repeated for all events that can be matched between the seismic reflectivity data and the synthetic reflectivity signals. The resulting time-gained pairs can be linearly interpolated to construct a gain or multiplier signal sampled at the same sample rate as that of the seismic reflectivity data.

A single multiplier signal can be used to restore the reflection coefficient amplitudes of an entire seismic line if the subsurface reflectors are nearly planar and flat. If the geology is more complex, it may be necessary to construct a plurality of multiplier signals along the seismic line and laterally interpolate multiplier signals between control points such as sonic logs using the seismic reflectivity data to follow the structure.

Upon completing reflection coefficient amplitude restoration, the low frequency band that is missing from the seismic reflectivity data can be recovered. Since the synthetic seismic reflectivity signals are bandpass filtered wherein the pass band is equal to the missing seismic band (e.g. 0-14 Hz), the corresponding 0-14 Hz synthetic signals can be added directly to the amplitude restored seismic reflectivity data at 145. Again, this can be done all along a seismic line from a synthetic reflectivity signal developed from a single location if the geology is laterally consistent. If the geology is more complex, then a procedure analogous to that described for amplitude restoration may be necessary.

At step 150, a running-sum integrator and exponentiation is applied to the corrected seismic reflectivity data from 145 to obtain compressional wave (P) and shear wave (S) interval velocities of subsurface formations. Such interval velocity can be displayed on a velocity plot at 160.

Since the velocity inversion technique of FIG. 4 is dependent on a sonic velocity log, the use of this technique in the lithology inversion method of FIG. 2 requires both P- and S-wave sonic velocity logs. However, if only P-wave sonic velocity data are available, the low-frequency (i.e. 0-14 Hz) portion of the S-wave velocity may be estimated by dividing the low-frequency P-wave velocity by a Vp/Vs curve constructed from the ratio of travel-time differences between successive corresponding reflectors in the compressional wave and shear wave seismic reflectivity data. If neither P-wave nor S-wave sonic velocity logs are available, the low-frequency portion of the compressional wave and shear wave seismic reflectivity data can be estimated using checkshot or normal-moveout methods.

The resulting P- and S-wave velocities obtained at step 150 are functions of the P- and S-wave two-way travel times, respectively. Before proceeding to the crossplotting for lithology inversion, the two velocities must be converted to a common time (or depth) variable. This can be accomplished by (1) converting the time variable of the S-wave velocity to P-wave two-way travel time, or (2) converting the time variable of the P-wave velocity to S-wave two-way travel time, or (3) convert the traveltime variables of both the P- and S-wave velocities to depth Z. Since the P- and S-wave travel times differ by approximately a factor of two, plotting the P-wave velocity at twice the time scale of the S-wave velocity (or plotting the S-wave velocity at half the time scale of the P-wave velocity) provides an approximate match. A slight time-stretch (or squeeze) of the rescaled velocity trace will then produce an exact match between the time scales of the two velocity traces. Conversion to depth requires velocity versus depth information such as sonic velocity logs or checkshot times from nearby wells.

Figure 5A:
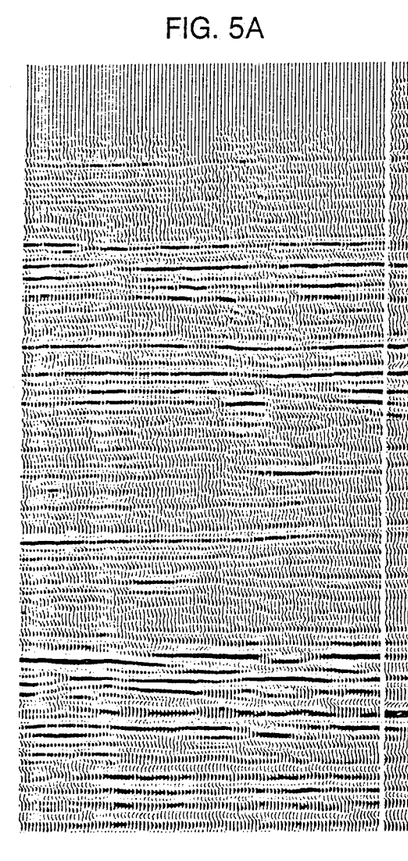
FIGS. 5A and 5B are compressional wave and shear wave, respectively, seismic reflectivity data over a coincident line of exploration.
Figure 5B:
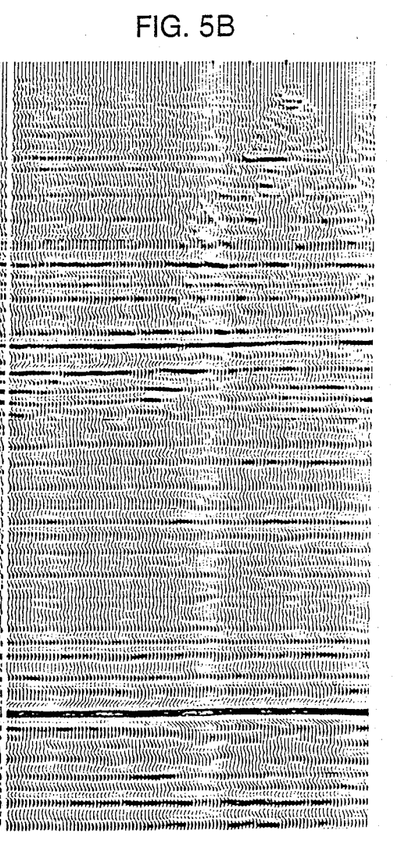

FIGS. 5A and B show coincident compressional wave and shear wave seismic reflectivity data recorded along a survey line and processed to achieve zero-phase distortion. These two sets of seismic reflectivity data were each phase-corrected using the results of a field technique for measuring the source wavelet followed by instrument dephasing. Both the compressional wave and shear wave seismic reflectivity data are plotted versus the P-wave two-way travel time. In this example, the compressional wave and shear wave seismic reflectivity data were first converted to a common time variable before inversion. Ideally, this should be done after velocity inversion to avoid violating the time-convolutional nature of the seismic reflectivity data for the velocity inversion process.

Figure 6A:
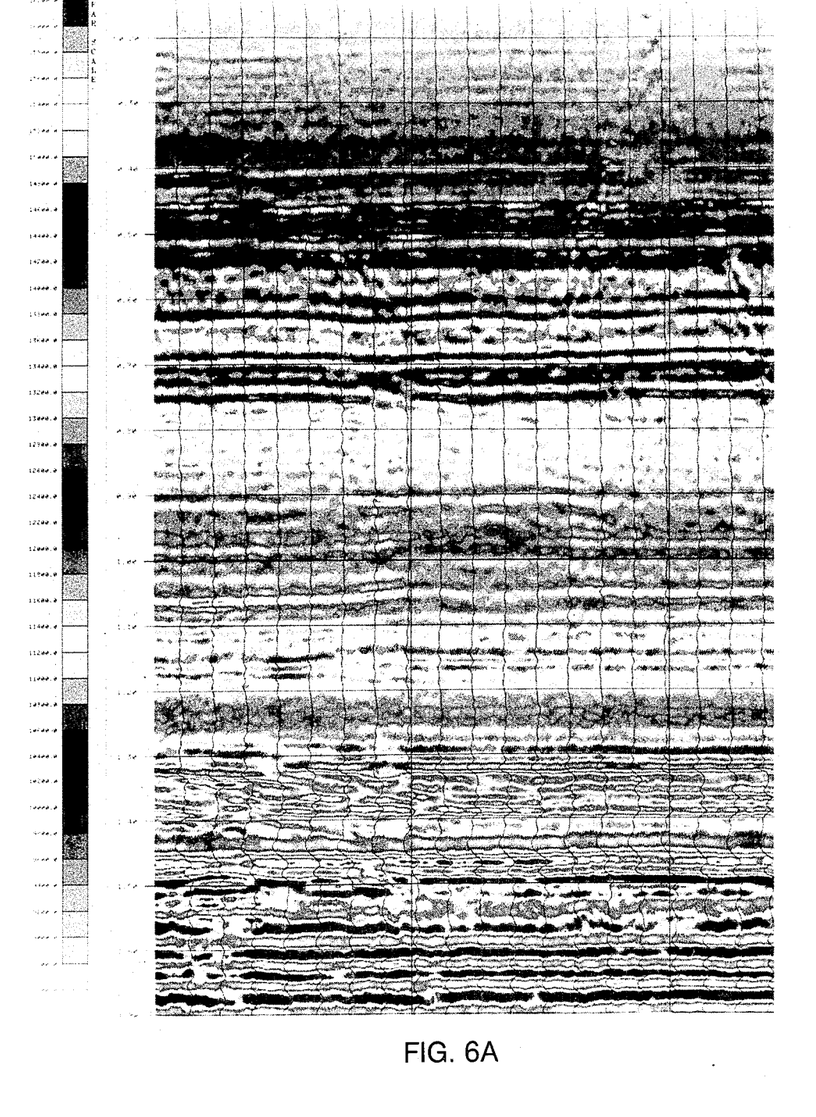
FIGS. 6A and 6B are color photographs of compressional wave and shear wave velocity sections, respectively, obtained from the seismic reflectivity data of FIGS. 5A and 5B.

In FIGS. 6A and B, P- and S-wave velocity traces are shown after inversion of the seismic reflectivity data from FIGS. 5A and 5B using the velocity-inversion method of FIG. 4. The agreement of the velocity traces estimated from seismic reflectivity data and the sonic logs is excellent. The P- and S-wave velocity traces are plotted in color using the same gradational color scheme for both wave types but with different numerical assignments, i.e., blue in the P-wave velocity section designates 13,600 to 13,800 ft/sec, whereas blue in the S-wave velocity section designates 7650 to 7780 ft/sec.

Figure 6B:
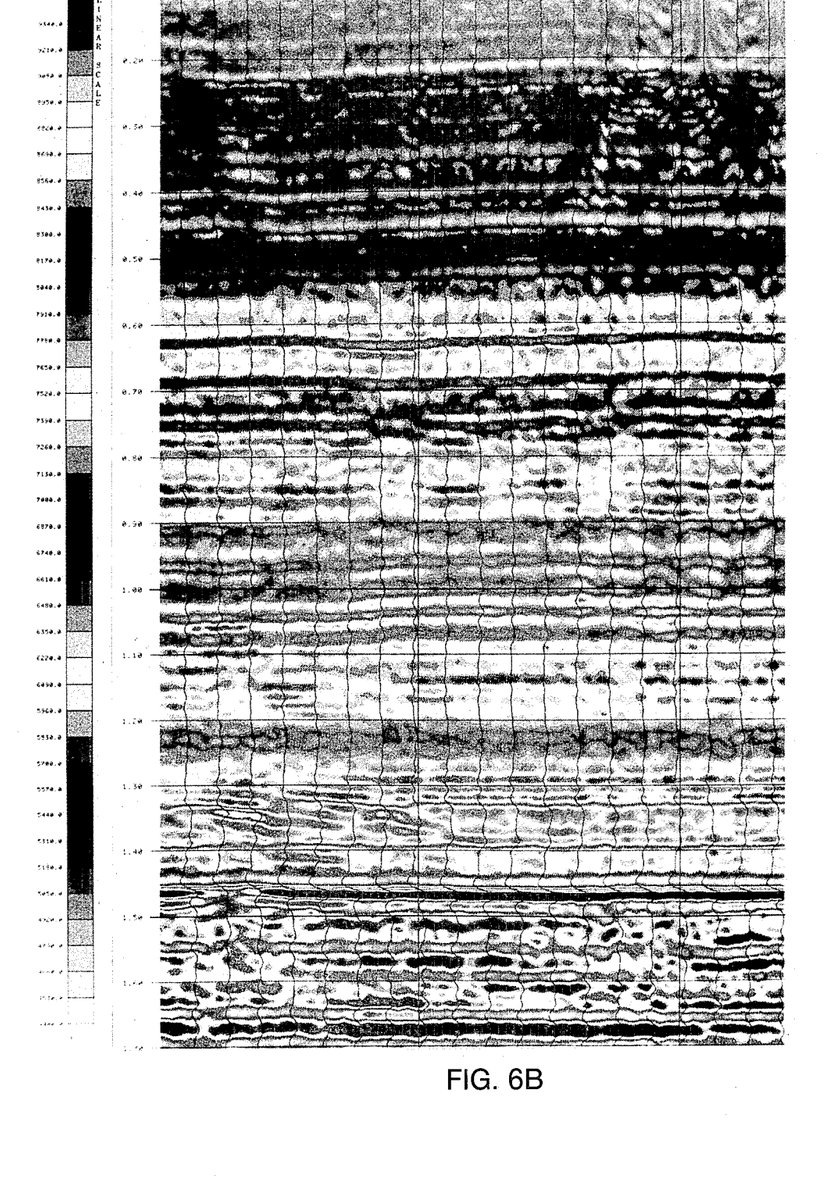

FIG. 7 shows the results of cross-plotting of the P- and S-wave velocity data of FIG. 6 on the lithology diagram of FIG. 3 to produce a chromatic lithology section. The grey designates the bins assigned to shale, brown to sand, blue to carbonate, grey-brown to shale sand, grey-blue to shale carbonate, brown-blue (green)

to sandy carbonate, and olive drab to shale-sand-carbonate.

The predicted lithologies in FIG. 7 agree well with known lithologic data for the region over which the seismic reflectivity data were obtained. The primary lithology above 1330 msec is shale of the massive Pierre shale formation containing numerous low-quality sands. The predominantly grey color above 1330 msec in FIG. 7 predicts this shale. The brown zones predict the interbedded sands and are in good agreement with sand responses from a nearby spontaneous potential (SP) log. The shallowest carbonates in this area are the Smoky Hill chalks within the Niobrara formation. These are delineated by the blue zones just below 1330 msec. The sonic velocity logs used for low-frequency recovery ended at about 1450 msec. Thus, the accuracy of the velocity inversions and the lithology inversion is questionable below this time. Above 1450 msec, however, the lithologies predicted in FIG. 7 are in good agreement with existing knowledge of subsurface lithology.

The present invention provides a unique method for obtaining estimates of formation lithology from seismic reflectivity data having horizontal and vertical resolution comparable to the seismic reflectivity data from which it is obtained. Those skilled in the art will appreciate that enhancements and modification to the present invention will be apparent, but the scope of the present invention is limited only by the claims provided.

What is claimed is:

1. A method for displaying estimates of selected combinations of formation lithology obtained from seismic reflectivity data, comprising the steps of:
   (a) forming a coordinate system having first and second axes each representative of selected formation elastic properties;
   (b) enclosing a region on the coordinate system defining a relationship between selected combinations of formation lithology and the selected formation elastic properties;
   (c) subdividing the enclosed region into a plurality of bins, wherein each bin corresponds to a selected combination of formation lithologies;
   (d) assigning a numeric identifier to each bin representative of separate combinations of formation lithologies;
   (e) crossplotting pairs of selected formation elastic properties obtained from the seismic reflectivity data on the coordinate system and associating each crossplotted pair of selected formation properties with a numeric identifier corresponding to a selected combination o formation lithologies;
   (f) transforming each numeric identifier associated with a selected combination of formation lithology into a selected color; and
   (g) plotting the selected colors as a chromatic lithology section wherein each color represents a selected combination of formation lithologies.

2. The method o claim 1, wherein the formation elastic properties are selected from the group comprising shear wave velocity, compressional wave velocity, the ratio of compressional wave velocity to shear wave velocity, Poisson's ratio, and bulk modulus.

3. The method of claim 1, wherein the step of transforming comprises generating a color look-up table relating each selected combination of formation lithologies with a selected color.

4. The method of claim 3, wherein the combination of formation lithologies are selected from the group including sandstone, shale, carbonate, sandstone-shale, sandstone-carbonate, and sandstone-shale-carbonate.

5. A method of inversion of seismic reflectivity data to yield estimates of selected combinations of formation lithology, comprising the steps of:
   (a) inverting the seismic reflectivity data and obtaining measures of at least two formation elastic properties;
   (b) forming a lithology diagram defining a region relation the two formation properties to selected combinations of formation lithology, wherein the region includes a plurality of bins subdividing the region so that each bin relates a selected set of formation properties to a selected combination of formation lithologies; and
   (c) crossplotting corresponding pairs of the formation properties on the lithology diagram and obtaining estimates of selected combination of formation lithology.

6. The method of claim 5, further including the step of:
   displaying the estimates of the selected combinations of formation lithology as a lithology section representative of the formations explored by the seismic reflectivity data, wherein the resolution of the lithology section is comparable to that of the seismic reflectivity data from which it is obtained.

7. The method of claim 5, further including the steps of:
   (a) assigning a color corresponding to each selected combinations of formation lithologies; and
   (b) displaying the estimates of selected combinations of formation lithologies as a chromatic lithology section.

8. The method of claim 7, wherein the selected combinations of formation lithologies comprise sandstone, shale, carbonate, sandstone-shale, sandstone-carbonate and sandstone-shale-carbonate.

9. The method of claim 5, further including the step of:
   (a) assigning a numeric identifier corresponding to selected combinations of formation lithologies; and
   (b) developing a lithology signal wherein the numeric identifier for each estimate of formational lithology is represented thereon.

10. The method of claim 9, further including the steps of:
    (a) transforming the numeric identifier to a chromatic identifier with the aid of a color look-up table, wherein each selected combination of formation lithologies corresponds to a unique color; and
    (b) displaying the estimates of formation lithology as a chromatic lithology section, wherein the selected combinations of formation lithologies are represented by unique colors.

11. The method of claim 5, wherein the lithology diagram further includes:
    each bin as being assigned a numeric identifier corresponding to each selected combination of formation lithology.

12. The method of claim 5, wherein the step of inverting the seismic reflectivity data includes the step of:
    inverting compressional wave and shear wave seismic reflectivity data and obtaining measures of formation compressional wave and shear wave interval velocities.

13. The method of claim 12, further including the step of:

correcting the compressional wave and shear wave seismic reflectivity data for phase distortion, amplitude scaling and missing seismic frequencies prior to the step of inverting.

14. A method of producing estimates of selected combinations of formation lithology from seismic reflectivity data comprising the steps of:
  (a) generating a synthetic reflectivity trace from sonic logging data obtained from at least one well in the area generally encompassed by the seismic reflectivity data;
  (b) stretching the synthetic reflectivity trace to coincide with the seismic reflectivity data;
  (c) using the stretched synthetic reflectivity trace as a guide, adjusting the amplitude and frequency content of the seismic reflectivity data;
  (d) inverting the adjusted seismic reflectivity data to obtain measures of subsurface formation compressional and shear wave velocities;
  (e) forming a lithology diagram defining a region relating formation compressional and shear wave velocities to selected combinations of formation lithology, wherein the region includes a plurality of bins subdividing the region so that each bin relates a selected set of compressional and shear wave velocities to a selected combination of formation lithologies; and
  (f) crossplotting measures of the compressional and shear wave velocities on a lithology diagram to obtain estimates of selected combinations of formation lithology.

* * * * *